(12) United States Patent
Tsukida et al.

(10) Patent No.: US 11,025,849 B2
(45) Date of Patent: Jun. 1, 2021

(54) PHOTOELECTRIC CONVERSION APPARATUS, SIGNAL PROCESSING CIRCUIT, IMAGE CAPTURING SYSTEM, AND MOVING OBJECT

(71) Applicant: CANON KABUSHIKI KAISHA, Tokyo (JP)

(72) Inventors: Kentaro Tsukida, Yokohama (JP); Takenori Kobuse, Kawasaki (JP); Shintaro Takenaka, Yokohama (JP); Daisuke Kobayashi, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/820,430

(22) Filed: Mar. 16, 2020

(65) Prior Publication Data
US 2020/0314378 A1 Oct. 1, 2020

(30) Foreign Application Priority Data
Mar. 26, 2019 (JP) .............................. JP2019-059369

(51) Int. Cl.
*H04N 5/235* (2006.01)
*H04N 5/3745* (2011.01)
*H04N 5/378* (2011.01)

(52) U.S. Cl.
CPC ......... *H04N 5/37455* (2013.01); *H04N 5/378* (2013.01)

(58) Field of Classification Search
CPC .......................... H04N 5/37455; H04N 5/378
USPC .................................................... 348/230.1
See application file for complete search history.

(56) References Cited

U.S. PATENT DOCUMENTS

| 2006/0146159 | A1* | 7/2006 | Farrier | H04N 5/3745 348/308 |
| 2006/0189511 | A1* | 8/2006 | Koblish | A61K 31/5513 514/221 |
| 2009/0021622 | A1* | 1/2009 | Kume | H04N 5/361 348/302 |
| 2011/0304757 | A1 | 12/2011 | Egawa | |
| 2013/0321083 | A1* | 12/2013 | Huang | H03G 3/007 330/282 |

FOREIGN PATENT DOCUMENTS

| JP | 2010-16416 A | 1/2010 |
| JP | 2011-259305 A | 12/2011 |
| JP | 2017-092554 A | 5/2017 |

* cited by examiner

*Primary Examiner* — Usman A Khan
(74) *Attorney, Agent, or Firm* — Canon U.S.A., Inc. IP Division

(57) ABSTRACT

In a photoelectric conversion apparatus, an amplification unit outputs a first amplified signal generated by amplifying a first signal using a first gain, a second amplified signal generated by amplifying the first signal using a second gain, a third amplified signal generated by amplifying a second signal using a third gain, and a fourth amplified signal generated by amplifying the second signal using a fourth gain to an analog to digital (AD) conversion unit in this order. The AD conversion unit generates first to fourth digital signals corresponding to the first to fourth amplified signals, respectively, and outputs the second digital signal and the third digital signal to an output unit prior to the first digital signal and the fourth digital signal.

16 Claims, 12 Drawing Sheets

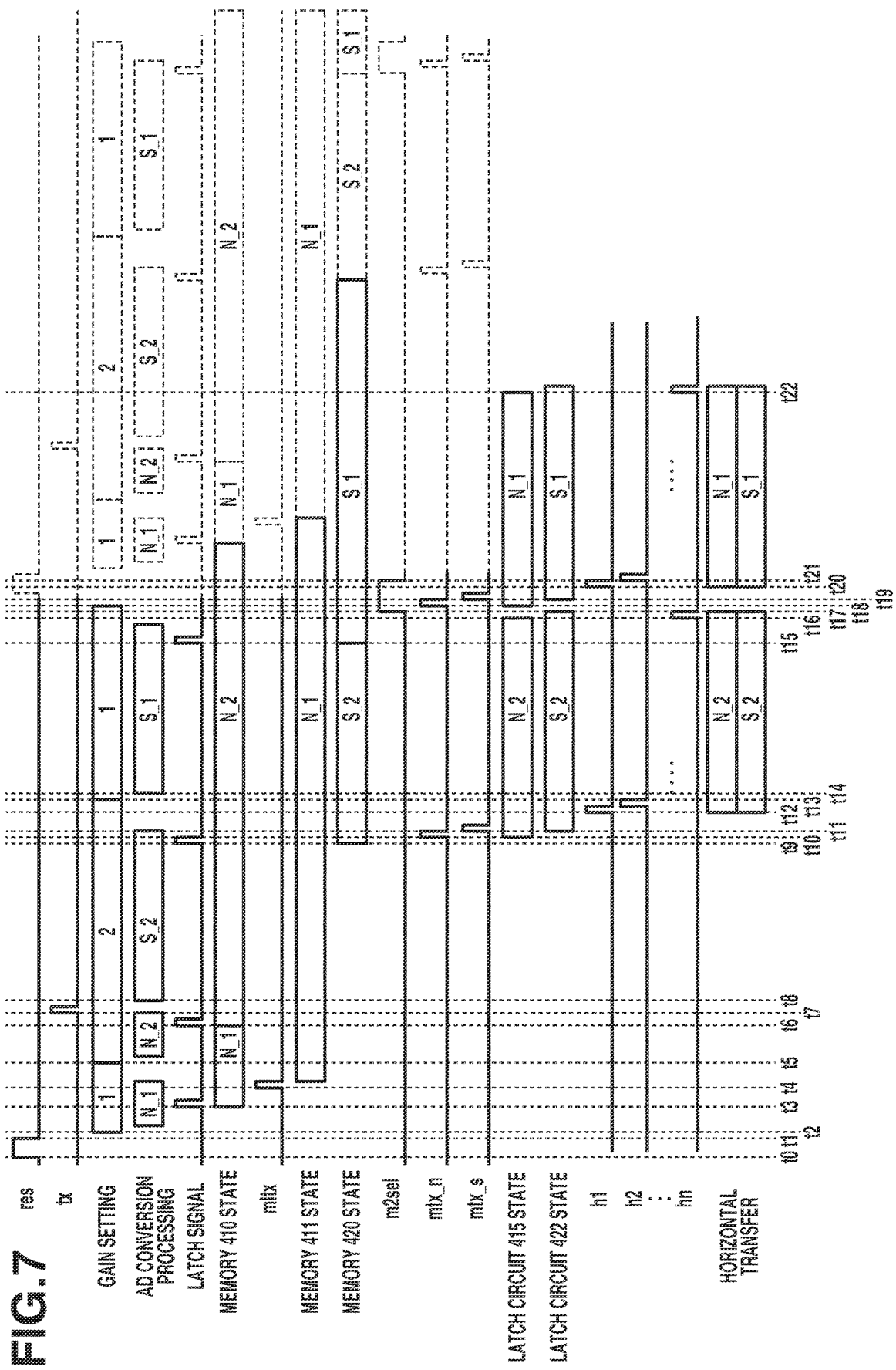

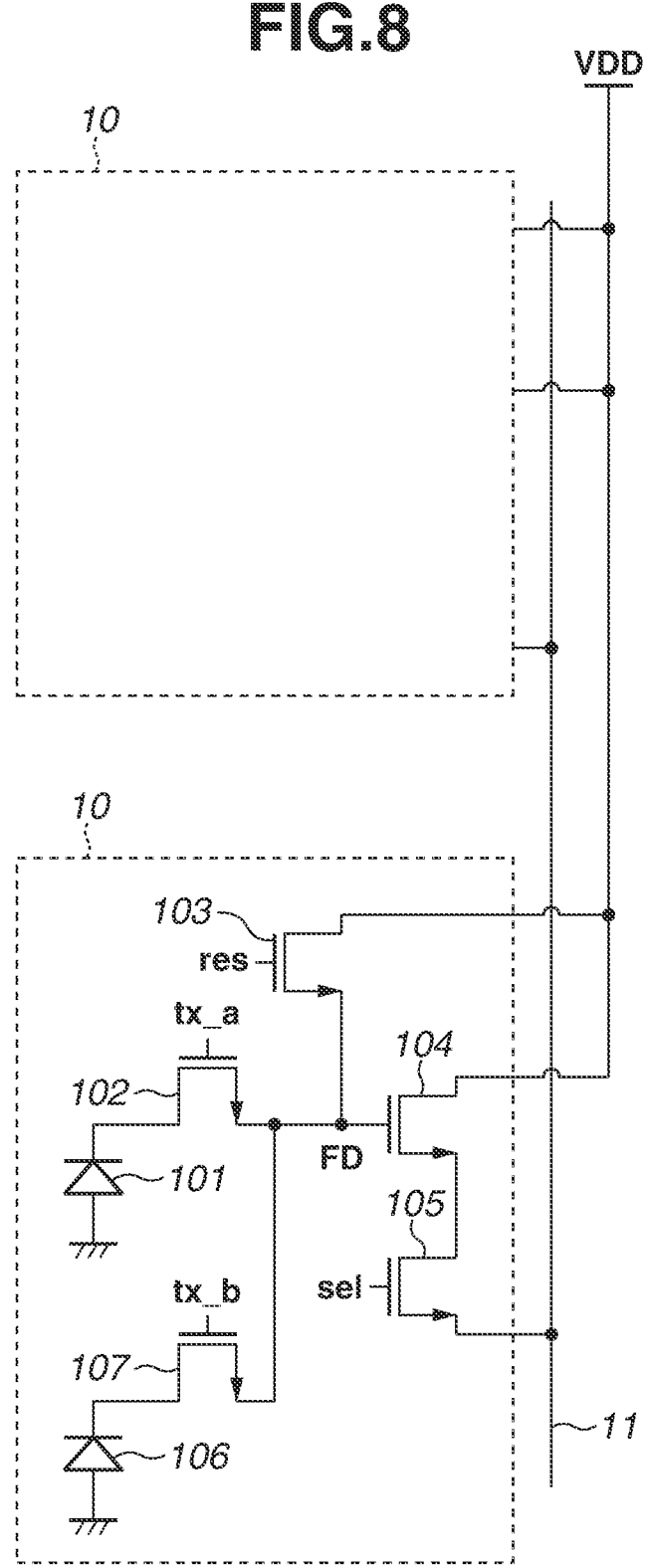

PHOTOELECTRIC CONVERSION APPARATUS, SIGNAL PROCESSING CIRCUIT, IMAGE CAPTURING SYSTEM, AND MOVING OBJECT

BACKGROUND

Field

One disclosed aspect of the embodiments relates to a photoelectric conversion apparatus, a signal processing circuit, an image capturing system, and a moving object.

Description of the Related Art

Photoelectric conversion apparatuses that output an electric signal based on incident light are known. In generating an image using a signal of a photoelectric conversion apparatus, for example, reduction of white raise and darkening in the generated image is demanded.

Japanese Patent Application Laid-Open No. 2010-16416 discusses a method in which each of a plurality of signals output at different timings by pixels is amplified using a plurality of gains to acquire a plurality of output signals. Japanese Patent Application Laid-Open No. 2010-16416 also discusses an operation of outputting all the plurality of output signals in parallel to an output unit.

In the technique discussed in Japanese Patent Application Laid-Open No. 2010-16416, an output order of a plurality of output signals is not sufficiently considered. A photoelectric conversion apparatus is required to support various output methods. In Japanese Patent Application Laid-Open No. 2010-16416, an output order of a plurality of output signals supplied to an output unit is not considered, in a case where all of the plurality of output signals are not output in parallel to the output unit.

SUMMARY

One aspect of the embodiments is in view of the above-described issues. According to an aspect of the embodiments, a photoelectric conversion apparatus includes a pixel, an amplification unit, an analog to digital (AD) conversion unit, and an output unit. The pixel is configured to output a first signal and a second signal at different timings. The amplification unit is configured to amplify the first signal and the second signal and output an amplified signal. The AD conversion unit is configured to perform AD conversion on the amplified signal and output a digital signal. The digital signal is input to the output unit. The amplification unit outputs a first amplified signal generated by amplifying the first signal using a first gain, a second amplified signal generated by amplifying the first signal using a second gain, a third amplified signal generated by amplifying the second signal using a third gain, and a fourth amplified signal generated by amplifying the second signal using a fourth gain to the AD conversion unit in this order. The first gain, the second gain, the third gain, and the fourth gain satisfy one of the following amplitude relationships (1) and (2): (the first gain)<(the second gain), and (the third gain)>(the fourth gain) (1), (the first gain)>(the second gain), and (the third gain)<(the fourth gain) (2). The AD conversion unit generates a first digital signal by AD conversion of the first amplified signal, a second digital signal by AD conversion of the second amplified signal, a third digital signal by AD conversion of the third amplified signal, and a fourth digital signal by AD conversion of the fourth amplified signal. The AD conversion unit outputs the second digital signal and the third digital signal to the output unit prior to the first digital signal and the fourth digital signal.

Further features of the disclosure will become apparent from the following description of exemplary embodiments with reference to the attached drawings.

BRIEF DESCRIPTION OF THE DRAWINGS

FIG. 7 is a timing chart diagram illustrating operations of the photoelectric conversion apparatus.

FIG. 8 illustrates a circuit diagram of a pixel configuration.

DESCRIPTION OF THE EMBODIMENTS

A case where the plurality of output signals is not output in parallel to the output unit will be discussed. In this case, a signal processing circuit may need to change a signal processing method associated with a gain change, if a plurality of output signals having significantly different gains from each other is input from the output unit to the signal processing circuit. In this case, the amount of signal processing per unit time decreases due to the increased time for the change operation.

Various exemplary embodiments will be described below.

A photoelectric conversion apparatus according to a first exemplary embodiment will be described below with reference to the drawings. Each conductivity type of a transistor described in the exemplary embodiments is a mere example and is not intended to limit the conductivity type. Each conductivity type described in the exemplary embodiments can be changed as needed. The potentials of a gate, source, and drain of a transistor are changed as a result of the change of the conductivity type. For example, in a case of a transistor configured to operate as a switch, the potential supplied to a gate of the transistor is changed between low and high levels oppositely to that described in the below-described exemplary embodiments as the conductivity type is changed. Each conductivity type of a semiconductor region described in the below-described exemplary embodiments is also a mere example and is not intended to limit the conductivity type. The conductivity type described in the below-described exemplary embodiments can be changed as needed, and a potential of the semiconductor region is changed as needed following the change.

Figure 1:
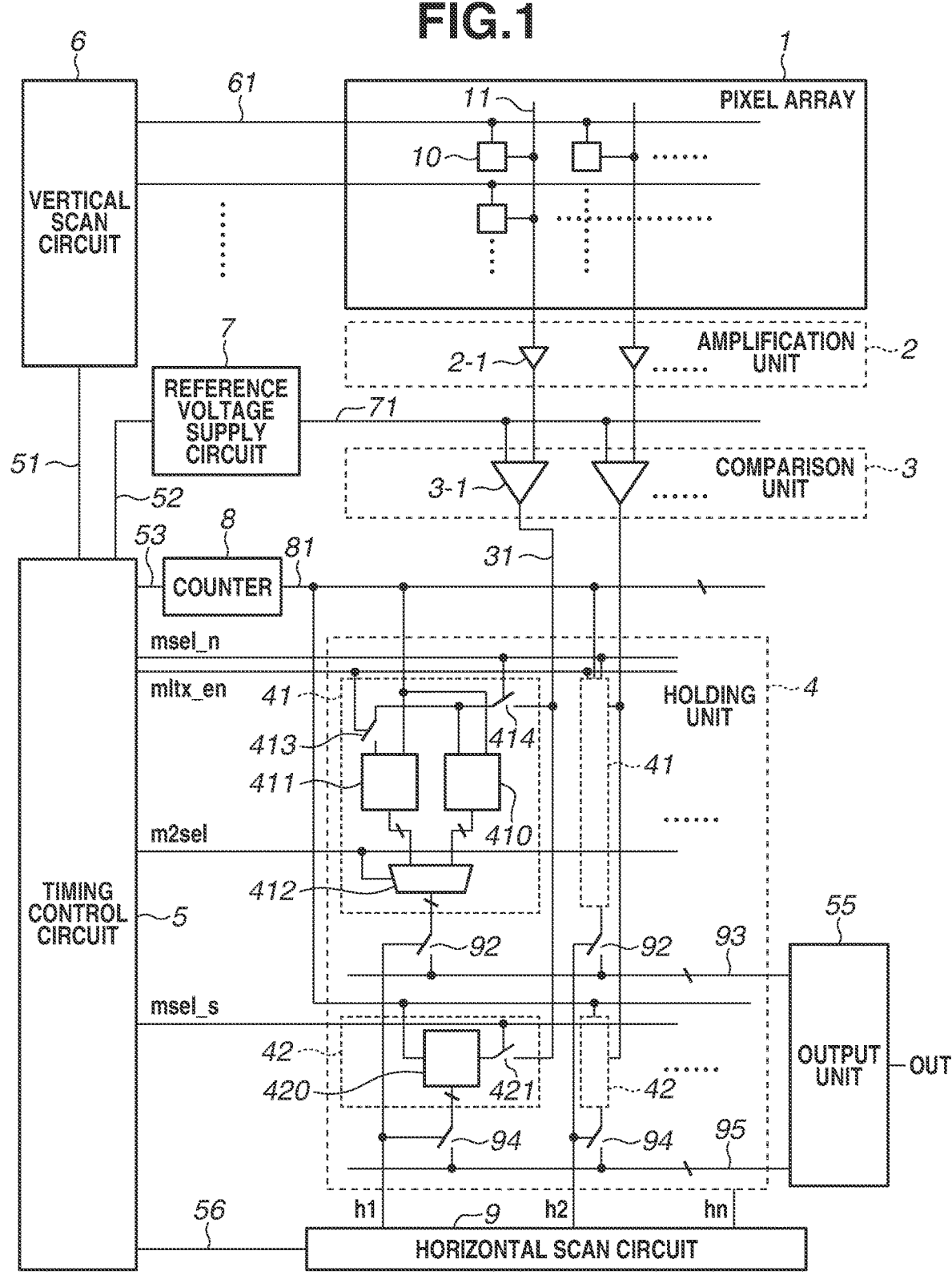
FIG. 1 is a block diagram illustrating a configuration of a photoelectric conversion apparatus.

FIG. 1 illustrates a configuration of the photoelectric conversion apparatus according to the first exemplary embodiment.

In a pixel array 1, a plurality of pixels 10 is arranged in a plurality of rows and a plurality of columns.

A vertical scan circuit 6 is connected to the pixels 10 of each of the plurality of rows via each corresponding control line 61.

A timing control circuit 5 is connected to the vertical scan circuit 6 via a control line 51. A vertical synchronization signal for controlling a scan of the vertical scan circuit 6 is output to the control line 51. The timing control circuit 5 is connected to a reference voltage supply circuit 7 and a counter 8 via control lines 52 and 53, respectively. A signal for controlling a start and end of a potential change of a ramp signal output from the reference voltage supply circuit 7 is output to the control line 52. Clock pulses are output to the control line 53. The timing control circuit 5 is connected to a holding unit 4.

A single corresponding signal line 11 is connected to the pixels 10 of each of a plurality of columns.

Each signal line 11 is connected to a single corresponding amplifier 2-1 of a plurality of amplifiers of an amplification unit 2. Each amplifier 2-1 of the amplification unit or circuit 2 amplifies each of a plurality of signals output from the pixel 10 using a plurality of gains to thereby generate a plurality of amplified signals.

A comparison unit, comparison circuit, or comparator 3 is connected to the amplification unit 2. The comparison unit 3 includes a plurality of comparators 3-1. A plurality of amplified signals is input to each of the plurality of comparators 3-1 from the single corresponding amplifier 2-1. The comparison unit 3 is connected to the reference voltage supply circuit 7 via a reference signal line 71. The reference voltage supply circuit 7 outputs a ramp signal to the plurality of the comparators 3-1 through the reference signal line 71. Each comparator 3-1 compares the ramp signal input from the reference voltage supply circuit 7 with each of the plurality of amplified signals, and generates a comparison result signal that indicates a result of the comparison. The comparison unit 3 outputs a latch signal to the holding unit 4 based on a change in signal level of the comparison result signal.

The holding unit or holding circuit 4 is connected to the comparison unit 3. The holding unit 4 is also connected to the counter 8 via a count signal line 81. The counter 8 generates a count signal by counting the clock pulses output from the timing control circuit 5.

The holding unit 4 includes a first memory circuit 41, a second memory circuit 42, and switches 92 and 94. The first memory circuit 41 includes memories 410 and 411, a selector 412 (selection circuit), and switches 413 and 414.

The second memory circuit 42 includes a memory 420 and a switch 421.

The count signal is input to the memories 410, 411, and 420 from the counter 8.

The latch signal output from the comparison unit 3 is output to the first memory circuit 41 and the second memory circuit 42.

A memory to which the comparison result signal is input is selected from the memories 410, 411, and 420 based on signals msel_n, mltx_en, and msel_s output from the timing control circuit 5.

The selector 412 selects a signal from one of the memories 410 and 411 based on a signal m2sel input from the timing control circuit 5, and outputs the selected signal to the switch 92.

The switches 92 and 94 are connected to a horizontal scan circuit 9. The switches 92 and 94 are turned on/off based on a scan signal hn (n is an integer of 1 or greater) output from the horizontal scan circuit 9.

When the switch 92 is turned on, the signal output from the selector 412 is output to a first output line 93.

When the switch 94 is turned on, the signal output from the memory 420 is output to a second output line 95.

The signal output to the first output line 93 and the second output line 95 is input to an output unit or output circuit 55. The output unit or output circuit 55 performs various types of processing, such as noise reduction processing, amplification processing, subtraction processing, and error correction processing, on the signal output to the first output line 93 and the second output line 95. The output unit or output circuit 55 outputs the processed signal to the outside of the photoelectric conversion apparatus.

The amplification unit 2, the comparison unit 3, and the holding unit 4 are signal processing circuits configured to process an input analog signal.

Figure 2:
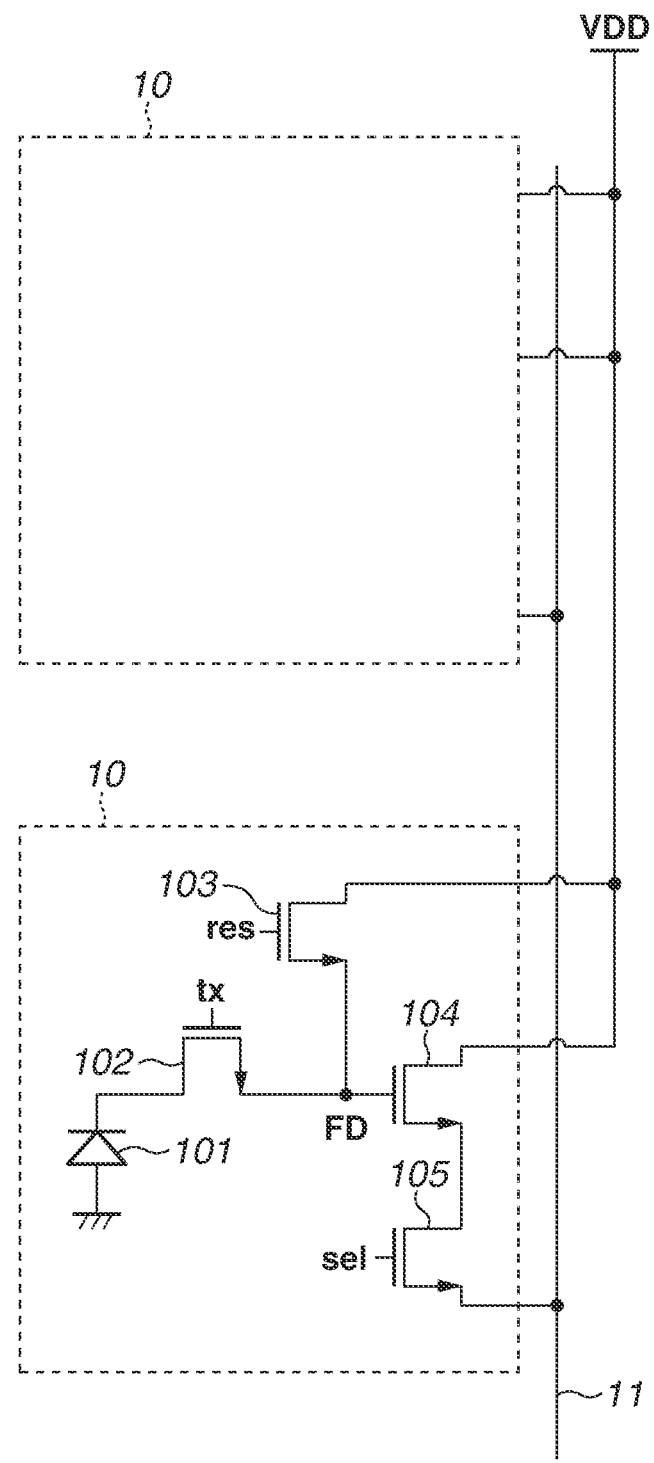
FIG. 2 illustrates a circuit diagram of a pixel configuration.

FIG. 2 illustrates a configuration of the pixel 10.

The pixel 10 includes four transistors: a photodiode 101 (photoelectric conversion unit), a transfer transistor 102, a reset transistor 103, an amplification transistor 104, and a selection transistor 105.

Gates of the transfer transistor 102, the reset transistor 103, and the selection transistor 105 are connected to the control lines 61 output from the vertical scan circuit 6, as illustrated in FIG. 1.

A transfer pulse tx, a reset pulse res, and a select pulse sel, which are supplied from the vertical scan circuit 6 illustrated in FIG. 1, are respectively input to the transfer transistor 102, the reset transistor 103, and the selection transistor 105. A source of the amplification transistor 104 is connected to an output line 11 via the selection transistor 105. The transfer transistor 102, the reset transistor 103, and the amplification transistor 104 are connected to a floating diffusion (FD) of the pixel 10.

Next, pixel signal reading, analog to digital (AD) conversion, and signal output operation will be described.

Figure 3:
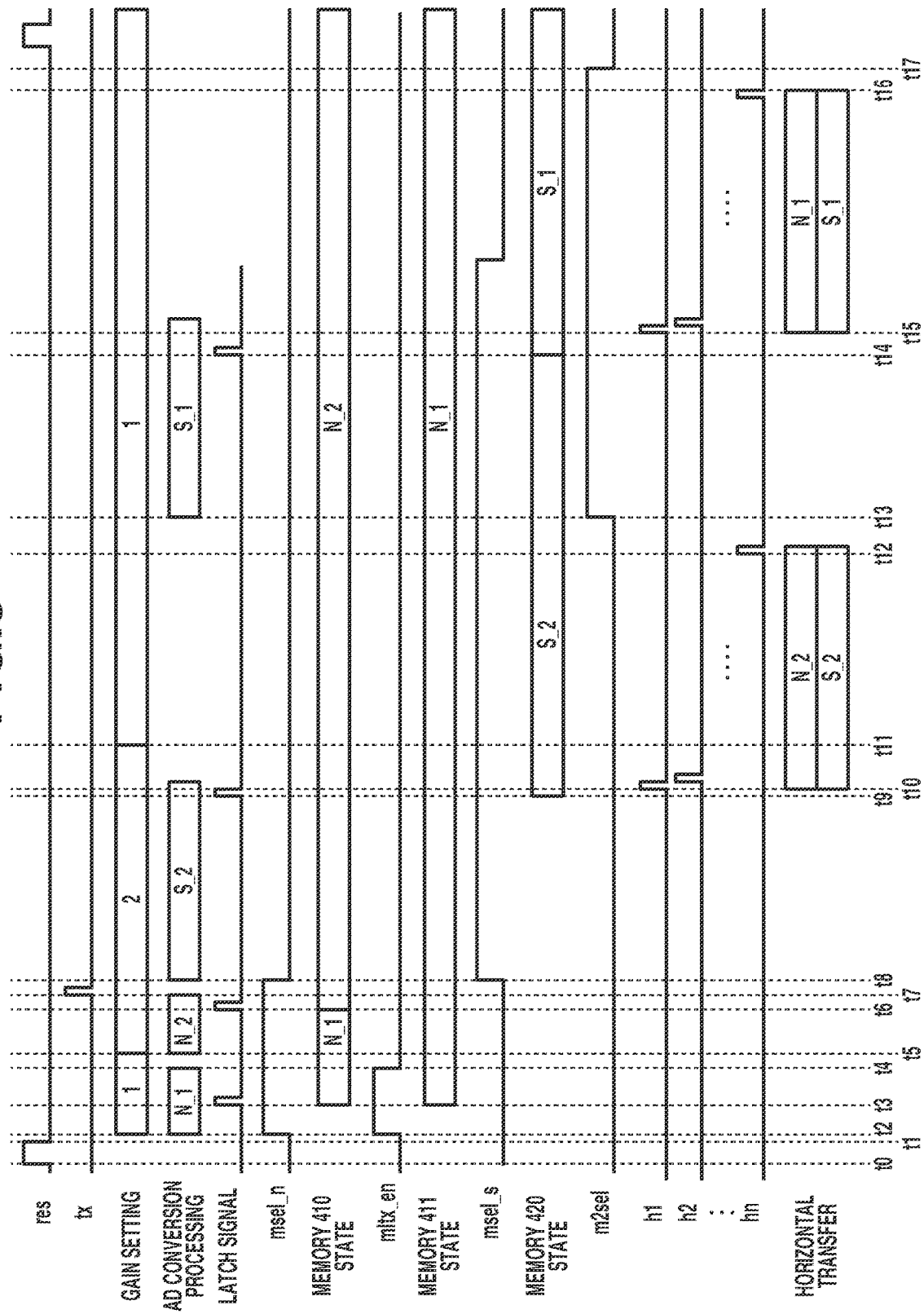
FIG. 3 is a timing chart diagram illustrating operations of the photoelectric conversion apparatus.

FIG. 3 is a timing chart illustrating an operation from reading pixel signals at a row to outputting according to the present exemplary embodiment.

The FD is reset in the period of time t0 to t1. At and after time t1, the pixel 10 outputs a signal (N-signal) based on the potential of the reset FD.

At time t2, the gain of the amplification unit 2 is set to a first gain. Further, the reference voltage supply circuit 7 starts a ramp operation using a ramp signal, and the counter 8 starts a counting operation. The signals msel_n and mltx_en are at a high level, and the switches 413 and 414 are on. A timing to set the amplification unit 2 to the first gain may be changed in advance before time t2.

A signal output from the amplification unit 2 at this time t2 is a signal generated by amplifying the N-signal by the first gain. The signal contains an offset component of the amplification unit 2 at the first gain.

There is a case where a correlated double sampling (CDS) circuit is provided at a stage prior to the amplification unit 2. The CDS circuit reduces noise output from the pixel 10. In this case, the CDS circuit holds the N-signal, and an input node of the amplification unit 2 has a reset level of the amplification unit 2. Thus, in the case where the CDS circuit is provided, a signal output from the amplification unit 2 is a signal that contains an offset signal of the amplification unit 2 at the first gain as a main component.

At time t3, the magnitude relationship between the ramp signal and the output of the amplification unit 2 is inverted, and the comparison result signal of the comparator 3-1 changes. In response to the change, the comparison unit 3 outputs a latch signal to the holding unit 4.

The latch signal is input to the memories 410 and 411, and the value of the count signal that is input from the counter 8 is held at the input timing of the latch signal. The memories 410 and 411 thereby hold a digital value corresponding to the N-signal based on the setting of the first gain of the amplification unit 2. In the case where the CDS circuit is provided at the stage prior to the amplification unit 2, the memories 410 and 411 hold a digital signal corresponding to the offset component based on the setting of the first gain of the amplification unit 2.

After the AD conversion is completed, the ramp signal and the count signal are initialized. Similarly, after the subsequent AD conversion thereafter is completed, the ramp signal and the count signal are initialized.

At time t4, the signal mltx_en is changed to a low level. Consequently, the switch 413 turns off. Thus, the latch signal is no longer input to the memory 411.

At time t5, the amplification unit 2 is set to a second gain higher than the first gain.

A signal output from the amplification unit 2 at time t5 is a signal generated by amplifying the N-signal using the second gain. The signal contains an offset component of the amplification unit 2 at the second gain.

In the case where the CDS circuit that reduces noise output from the pixel 10 is provided at the stage prior to the amplification unit 2, the signal output from the amplification unit 2 is a signal that contains an offset signal of the amplification unit 2 at the second gain as a main component.

The reference voltage supply circuit 7 starts a ramp operation of a ramp signal and the counter 8 starts a counting operation.

The setting timing of the gain of the amplification unit 2 may be changed between time t4 and t5.

At time t6, the magnitude relationship between the ramp signal and the output of the amplification unit 2 is inverted, and the comparison result signal of the comparator 3-1 changes. In response to the change, the comparison unit 3 outputs a latch signal to the holding unit 4.

The latch signal is input to the memory 410 (the latch signal is not input to the memory 411), and the value of the count signal that is input from the counter 8 is held at the input timing of the latch signal. The memory 410 thereby holds a digital signal corresponding to the N-signal based on the setting of the second gain of the amplification unit 2. In the case where the CDS circuit is provided at the stage prior to the amplification unit 2, the memory 410 holds a digital signal corresponding to the offset component of the amplification unit 2 based on the setting of the second gain.

At time t7, the vertical scan circuit 6 changes a signal tx to a high level, and turns on the transfer transistor 102. Consequently, charges accumulated by the photodiode 101 based on incident light are transferred to the FD. Thus, the pixel 10 outputs a signal (e.g., S+N signal), which is superimposed a signal based on the incident light on the N-signal, to the amplification unit 2. Thereafter, the vertical scan circuit 6 changes the signal tx to a low level.

A signal output from the amplification unit 2 at time t8 is a signal generated by amplifying the S+N signal using the second gain. The signal contains an offset component of the amplification unit 2 at the second gain.

There is a case where the CDS circuit that reduces noise output from the pixel 10 is provided at the stage prior to the amplification unit 2. In this case, main components of the output signal of the amplification unit 2 are a signal that contains an offset signal of the amplification unit 2 at the second gain and a signal generated by amplifying the difference (i.e., S-signal) between the S+N signal and the N-signal using the second gain.

At time t8, the reference voltage supply circuit 7 starts a ramp operation using a ramp signal, and the counter 8 starts a counting operation. The timing control circuit 5 changes the signal msel_n to a low level and turns off the switch 414. The timing control circuit 5 also changes the signal msel_s to a high level and turns on the switch 421. The switch timings of the switch 414 and the switch 421 can be different as long as the timings are within the period from time t7 to t8.

At time t9, the magnitude relationship between the ramp signal and the output of the amplification unit 2 is inverted, and the comparison result signal of the comparator 3-1 changes. In response to the change, the comparison unit 3 outputs a latch signal to the holding unit 4.

The latch signal is input to the memory 420, and the value of the count signal that is input from the counter 8 is held at the input timing of the latch signal. The memory 420 thereby holds a digital signal corresponding to the S+N signal based on the setting of the second gain of the amplification unit 2. In the case where the CDS circuit is provided at the stage prior to the amplification unit 2, the memory 410 holds a digital signal corresponding to the offset component of the amplification unit 2 based on the setting of the second gain and a signal generated by amplifying the S-signal using the second gain.

In the period between time t10 and t12, horizontal scan signals h1, h2, . . . , and hn are sequentially output, and the switches 92 and 94 of each column are connected to the first output line 93 and the second output line 95, respectively, and thus results of AD conversion of the N-signal and the S-signal of each column based on the setting of the second gain are output.

At time t11, the amplification unit 2 is set to the first gain. The amplification unit 2 outputs a signal generated by amplifying the S+N signal using the first gain. The signal contains the offset component of the amplification unit 2 at the first gain.

There is a case where the CDS circuit that reduces noise output from the pixel 10 is provided at the stage prior to the amplification unit 2. In this case, main components of the output signal of the amplification unit 2 are a signal that contains an offset signal of the amplification unit 2 at the first gain and a signal generated by amplifying the difference (i.e., S-signal) between the S+N signal and the N-signal using the first gain.

At time t13, the reference voltage supply circuit 7 starts a ramp operation of a ramp signal, and the counter 8 starts a counting operation.

The timing control circuit 5 changes the signal m2sel to a high level and controls the selector 412 such that the memory 411 outputs the digital signal.

At time t14, the magnitude relationship between the ramp signal and the output of the amplification unit 2 is inverted, and the comparison result signal of the comparator 3-1 changes. In response to the change, the comparison unit 3 outputs a latch signal to the holding unit 4.

The latch signal is input to the memory 410, and the value of the count signal that is input from the counter 8 is held at the input timing of the latch signal. The memory 410 thereby holds a digital signal corresponding to the S+N signal based on the setting of the first gain of the amplification unit 2. In the case where the CDS circuit is provided at the stage prior to the amplification unit 2, the memory 410 holds a digital signal corresponding to the offset component of the amplification unit 2 based on the setting of the first gain and a signal generated by amplifying the S-signal using the first gain.

After the AD conversion is completed, the timing control circuit 5 changes the signal msel_s to a low level and turns off the switch 421.

In the period between time t15 and t16, the horizontal scan signals h1, h2, ..., and hn are sequentially output, and the switches 92 and 94 of each column are connected to the first output line 93 and the second output line 95, respectively, and thus results of AD conversion of the N-signal and the S-signal of each column based on the setting of the first gain are output.

At time t17, the timing control circuit 5 changes the signal m2sel to a low level. This is a preparation for input of the N-signal from the pixel 10 of the next row.

As described above, according to the present exemplary embodiment, the N-signal and the S-signal can be read at different gains using a fewer number of memories than that of memories used in a conventional technique, so that the circuit size can be reduced.

In the present exemplary embodiment, the gain setting of the amplification unit 2 is performed in an order of the first gain, the second gain, and the first gain. The order is not limited to that described in this example. The order may be the second gain, the first gain, and the second gain. In this case, the amplification unit 2 outputs a signal generated by amplifying the N-signal using the second gain, a signal generated by amplifying the N-signal using the first gain, a signal generated by amplifying the S-signal using the first gain, and a signal generated by amplifying the S-signal using the second gain in this order. To perform AD conversion in this order, an AD conversion unit can swap the signals held by the memories 410 and 411 included in the holding unit 4. The memory 420 holds signals S_1 and S_2 in this order.

According to the present exemplary embodiment, the amplification unit 2 has two gains: the first and the second gain. However, more gains can be used. For example, the first gain and the second gain can be applied to the N-signal while a plurality of gains having values different from the first gain and the second gain can be applied to the S-signal. Specifically, the gains applied to the N-signal and the S-signal are to satisfy either one of the following relationships (1) and (2):

(the first gain)<(the second gain), and (the third gain)>(the fourth gain)     (1), and (the first gain)>(the second gain), and (the third gain)<(the fourth gain)     (2), where the first gain and the second gain are gains that are applied to the N-signal, and the third gain and the fourth gain are gains that are applied to the S-signal.

The first gain and the fourth gain can have the same value, and the second gain and the third gain can have the same value.

The example in which the photoelectric conversion unit is a photodiode that generates a signal charge and accumulates the generated signal charge has been described above. However, the photoelectric conversion unit can be an avalanche photodiode that avalanches and multiplies a signal charge as another example.

A photoelectric conversion apparatus according to a second exemplary embodiment will be described below, mainly for a difference from the first exemplary embodiment.

Figure 4:
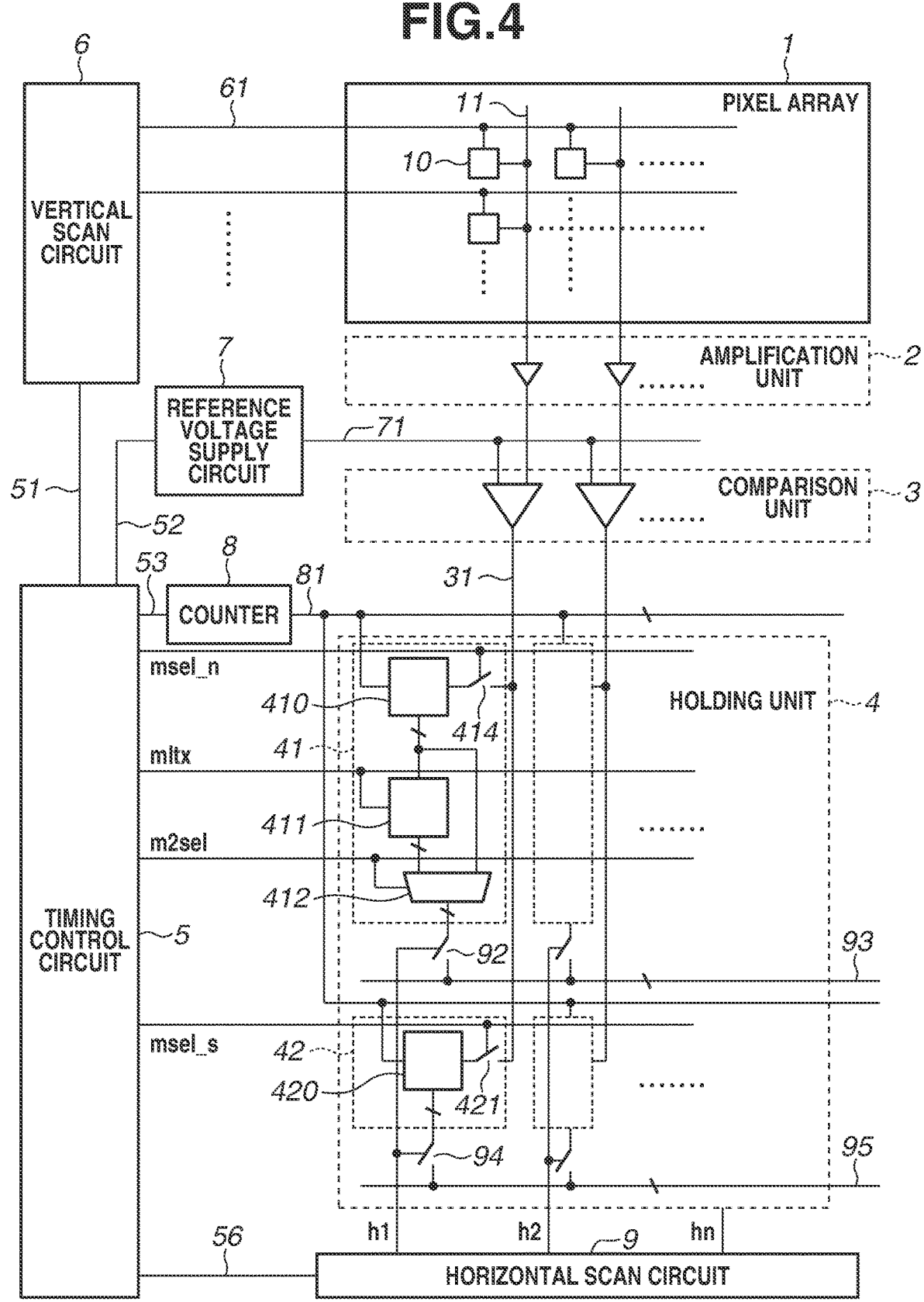
FIG. 4 is a block diagram illustrating a configuration of a photoelectric conversion apparatus.

FIG. 4 illustrates a configuration of the photoelectric conversion apparatus according to the present exemplary embodiment.

In the photoelectric conversion apparatus according to the present exemplary embodiment, the configuration of the first memory circuit 41 is different from that of the photoelectric conversion apparatus described in the first exemplary embodiment. According to the present exemplary embodiment, an output node of the memory 410 is connected to an input node of the selector 412 and an input node of the memory 411.

A signal holding operation of the memory 411 is controlled by the signal mltx.

Figure 5:
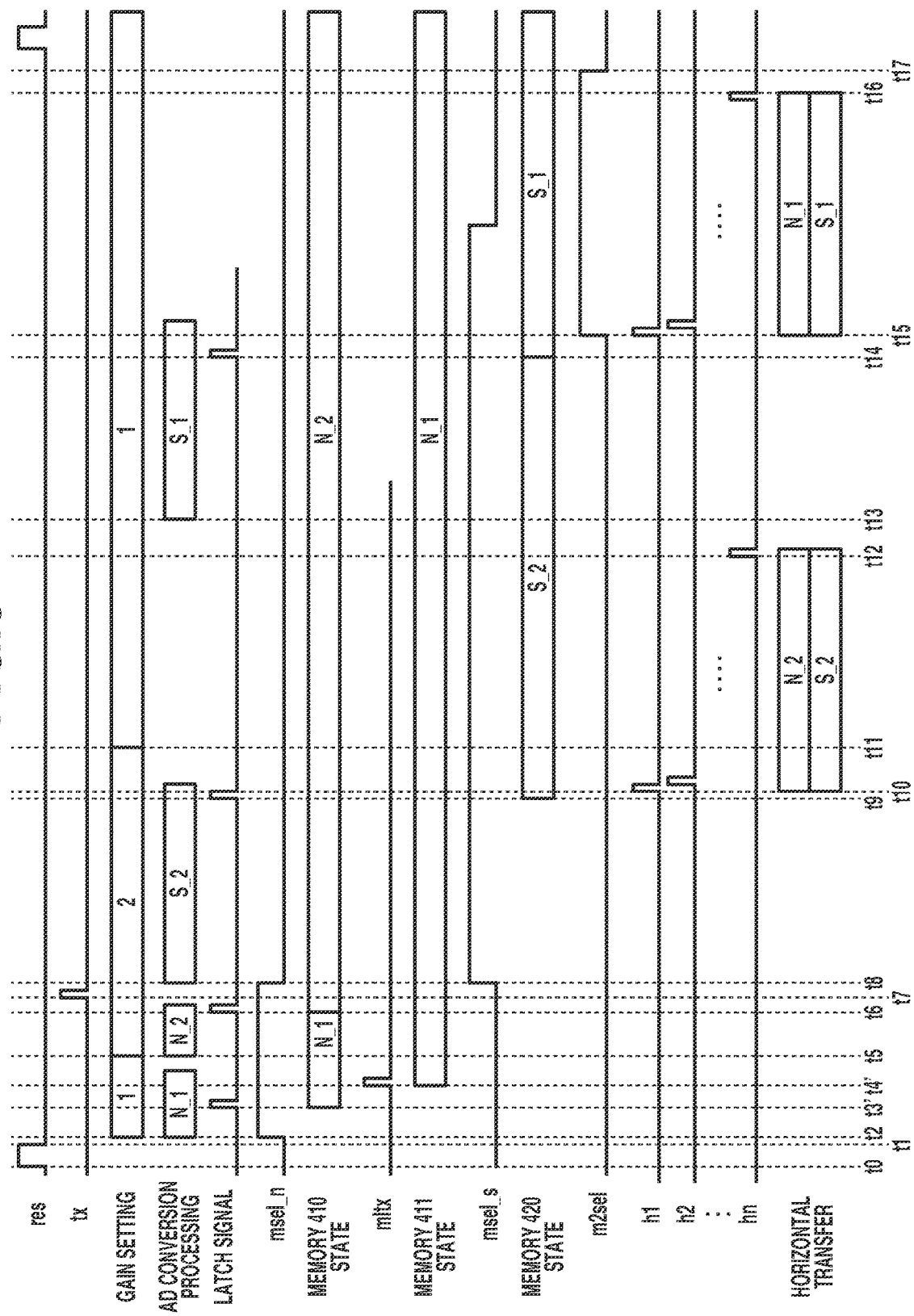
FIG. 5 is a timing chart diagram illustrating operations of the photoelectric conversion apparatus.

FIG. 5 is a timing chart illustrating a signal processing operation for one pixel row included in the photoelectric conversion apparatus illustrated in FIG. 4.

At time t3', the magnitude relationship between the ramp signal and an amplified signal output from the amplifier 2-1 is inverted, and thus the comparison result signal of the comparator 3-1 changes. In response to the change of the output of the comparison result signal, the comparison unit 3 outputs a latch signal to the holding unit 4.

The memory 410 holds the value of the count signal that is input to the memory 410 at the timing when the latch signal is input. In this way, AD conversion of the N-signal based on the setting of the first gain is completed. At this time, the memory 411 is not updated.

At time t4', the timing control circuit 5 changes the signal level of the signal mltx to a high level.

The memory 411 thereby holds the signal held by the memory 410 (copy operation). Thus, as in the first exemplary embodiment, the memory 411 can hold the digital signal corresponding to the N-signal based on the setting of the first gain.

The other operations excluding the above-described operation are similar to those described in the first exemplary embodiment. The photoelectric conversion apparatus according to the present exemplary embodiment performs AD conversion of the N-signal based on the setting of the first gain and AD conversion of the N-signal based on the setting of the setting of the second gain both using the memory 410.

In the case where a different memory is used for each AD conversion process as in the first exemplary embodiment, a signal path of the latch signal from the comparison unit 3 to the memory differs. This may cause a difference in transfer time of the latch signal from the comparison unit 3 to the memory. The difference in transfer time may lead to a difference in the value of the count signal to be held by the memory. The difference in the signal path of the latch signal from the comparison unit 3 to the memory may cause an AD conversion error.

The photoelectric conversion apparatus according to the present exemplary embodiment performs a plurality of AD conversion processes using the single memory 410, so that the same transfer path of the latch signal from the comparison unit 3 to the memory can be used in the plurality of AD conversion processes. This produces an advantage that an AD conversion error that may occur in the photoelectric conversion apparatus according to the first exemplary embodiment can be reduced.

In the present exemplary embodiment, the gain of the amplification unit 2 is set to the first gain, the second gain, and the first gain in this order. The order of the gain setting is not limited to the above-described example. The gain can be set to the second gain, the first gain, and the second gain in this order as in a modified example of the first exemplary embodiment. In this case, the amplification unit 2 outputs a signal generated by amplifying the N-signal using the second gain, a signal generated by amplifying the N-signal using the first gain, a signal generated by amplifying the S-signal using the first gain, and a signal generated by amplifying the S-signal using the second gain in this order. To perform AD conversion in this order, the AD conversion unit swaps the signals held by the memories 410 and 411 included in the holding unit 4. The memory 420 holds the signals S_1 and S_2 in this order.

A photoelectric conversion apparatus according to a third exemplary embodiment will be described below, mainly a difference from the first exemplary embodiment.

Figure 6:
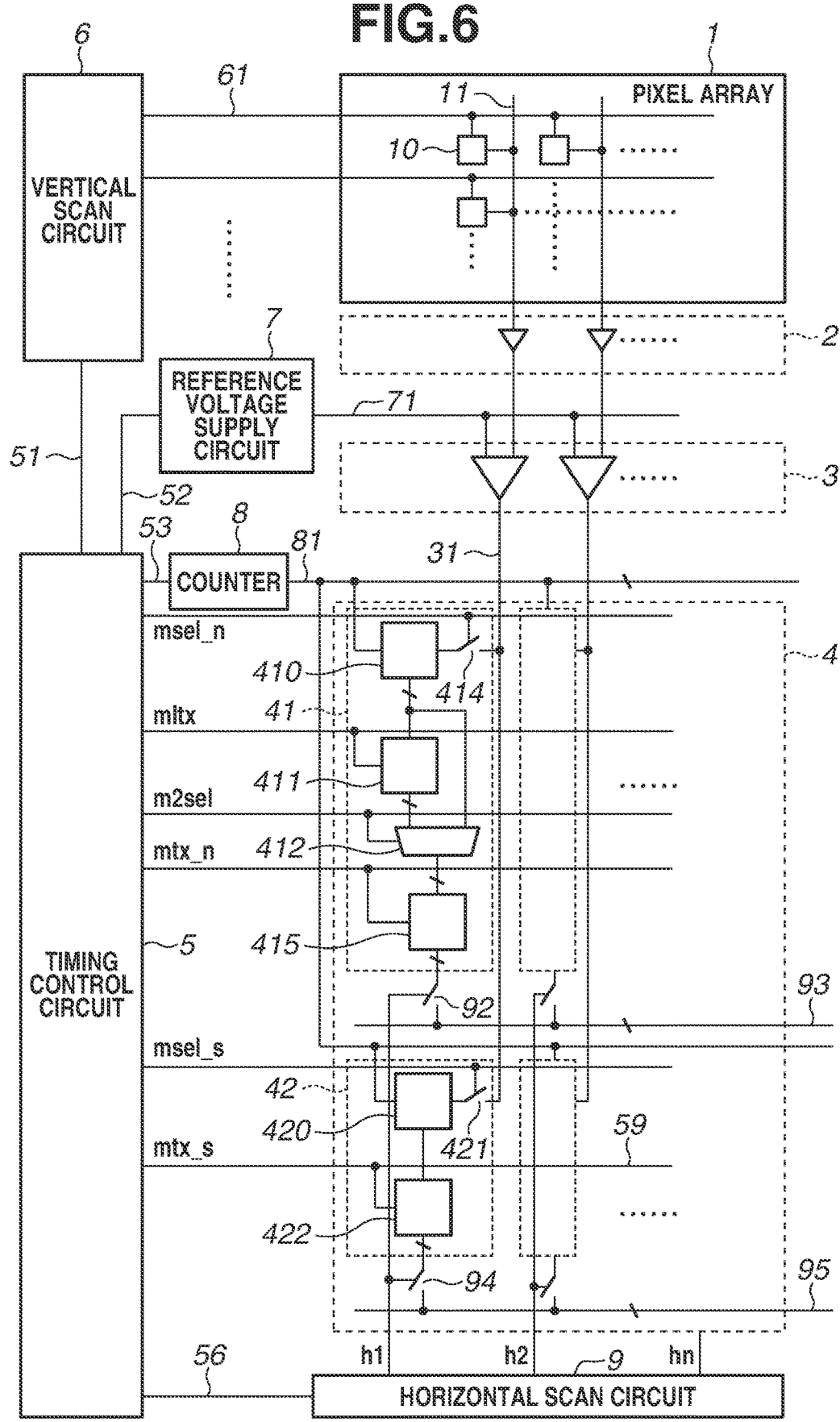
FIG. 6 is a block diagram illustrating a configuration of a photoelectric conversion apparatus.

FIG. 6 illustrates a configuration of the photoelectric conversion apparatus according to the present exemplary embodiment.

The photoelectric conversion apparatus according to the present exemplary embodiment is different from the photoelectric conversion apparatus according to the first exemplary embodiment in that the first memory circuit 41 includes a memory 415, and the second memory circuit 42 includes a memory 422.

An output node of the selector 412 is connected to an input node of the memory 415. The timing to latch a signal supplied from the selector 412 to the memory 415 is controlled by a control signal mtx_n output from the timing control circuit 5. An output node of the memory 415 is connected to the switch 92.

An output node of the memory 420 is connected to an input node of the memory 422. The timing to latch a signal supplied from the memory 420 to the memory 422 is controlled by a control signal mtx_s output from the timing control circuit 5. An output node of the memory 422 is connected to the switch 94.

FIG. 7 is a timing chart illustrating a signal processing operation for one pixel row according to the present exemplary embodiment.

The operations up to time t9 are similar to those described in the second exemplary embodiment.

At time t10, the signal mtx_n is changed to a high level so that the memory 415 holds a digital signal corresponding to the N-signal at the setting of the second gain.

At time t11, the signal mtx_n is changed to a high level so that the memory 422 holds a digital signal corresponding to the S-signal based on the setting of the second gain.

The order of the timing to latch by the memory 415 and the timing to latch by the memory 422 may be a different order from that illustrated in FIG. 7. Either one of the timings can be prior to the other or the timings can be the same timing.

In the period between time t12 to time t16, the horizontal scan circuit 9 sequentially outputs the horizontal scan signals h1, h2, . . . , and hn. Consequently, the switches 92 and 94 of each column sequentially output a digital signal to the first output line 93 and the second output line 95, respectively (horizontal transfer).

At time t13, the gain of the amplification unit 2 is set to the first gain.

At time t14, AD conversion of the S-signal based on the setting of the first gain is started.

At this time, horizontal transfer of the digital signals respectively corresponding to the N-signal and the S-signal based on the setting of the second gain is being performed. However, the digital signals that are to be horizontally transferred are respectively held by the memories 415 and 422. Thus, a value of the memory 420 can be updated to a digital signal corresponding to the S-signal based on the setting of the first gain, while the horizontal transfer is being performed.

At time t15, the value of the memory 420 is updated to the digital signal corresponding to the S-signal based on the setting of the first gain.

At time t16, the horizontal transfer of the S-signal based on the setting of the second gain ends.

At time t17, the signal m2sel is changed to a high level. Consequently, the value of the memory 411 is output from the selector 412.

At time t18, the signal mtx_n is changed to a high level. Consequently, the memory 415 holds the digital signal corresponding to the N-signal based on the setting of the first gain.

At time t19, a signal mts_s is changed to a high level. Consequently, the memory 422 holds the digital signal corresponding to the S-signal based on the setting of the first gain.

Thereafter, in the period between time t20 and t22, horizontal transfer of the digital signals respectively corresponding to the N-signal and the S-signal that are based on the setting of the first gain is performed.

The photoelectric conversion apparatus according to the present exemplary embodiment generates a digital signal corresponding to a signal of one of a plurality of gain settings during the horizontal transfer of a digital signal corresponding to a signal of another one of the plurality of gains. In this way, the length of time from an end of pixel signal reading of a row (end of AD conversion) to a start of signal reading of the next row (start of AD conversion) is reduced.

Further, a similar advantage can be obtained by adding the memories 415 and 422 and the corresponding control signals as described in the present exemplary embodiment to the configuration of the photoelectric conversion apparatus according to the first exemplary embodiment.

A number of memories included in the holding unit 4 is increased by the memories 415 and 422. However, a configuration used in a conventional technique requires more memories than the present exemplary embodiment does to reduce the length of time from an end of pixel signal reading of a row (end of AD conversion) to a start of signal reading of the next row (start of AD conversion). Thus, the photoelectric conversion apparatus according to the present exemplary embodiment also produces an advantage of circuit area reduction.

In the present exemplary embodiment, the gain of the amplification unit 2 is set to the first gain, the second gain, and the first gain in this order. The order is not limited to that of this example. The order may be the second gain, the first gain, and the second gain as described in the modified example of the first exemplary embodiment. In this case, the amplification unit 2 outputs a signal generated by amplifying the N-signal using the second gain, a signal generated by amplifying the N-signal using the first gain, a signal generated by amplifying the S-signal using the first gain, and a signal generated by amplifying the S-signal using the second gain in this order. To perform AD conversion in this order, the AD conversion unit swaps the signals held by the memories 410 and 411 included in the holding unit 4. The memories 420 and 422 hold the signals S_1 and S_2 in this order.

A photoelectric conversion apparatus according to a fourth exemplary embodiment will be described, mainly a difference from the first exemplary embodiment.

FIG. 8 illustrates a configuration of the pixel 10 according to the present exemplary embodiment. The present exemplary embodiment is different from the photoelectric conversion apparatus according to the first exemplary embodiment in that each pixel 10 includes a plurality of photodiodes.

Each pixel 10 includes photodiodes 101 and 106. The photodiodes 101 and 106 are provided correspondingly to a single microlens (not illustrated in FIG. 8) as described below. Specifically, light having transmitted through the single microlens enters the photodiodes 101 and 106. In other words, the photodiodes 101 and 106 receive incident light from different exit pupils from each other. In general, the photodiodes 101 and 106 do not overlap each other and are disposed next to each other with a separation region therebetween in planar view. The separation region is an insulated isolation region, or a semiconductor region where a charge having opposite polarity to the polarity of a signal charge accumulated by the photodiodes 101 and 106 is a main carrier.

The photodiode 106 is connected to the FD via a second transfer transistor 107. The other configuration of the pixel 10 is similar to that of the pixel 10 according to the first exemplary embodiment.

Figure 9A:
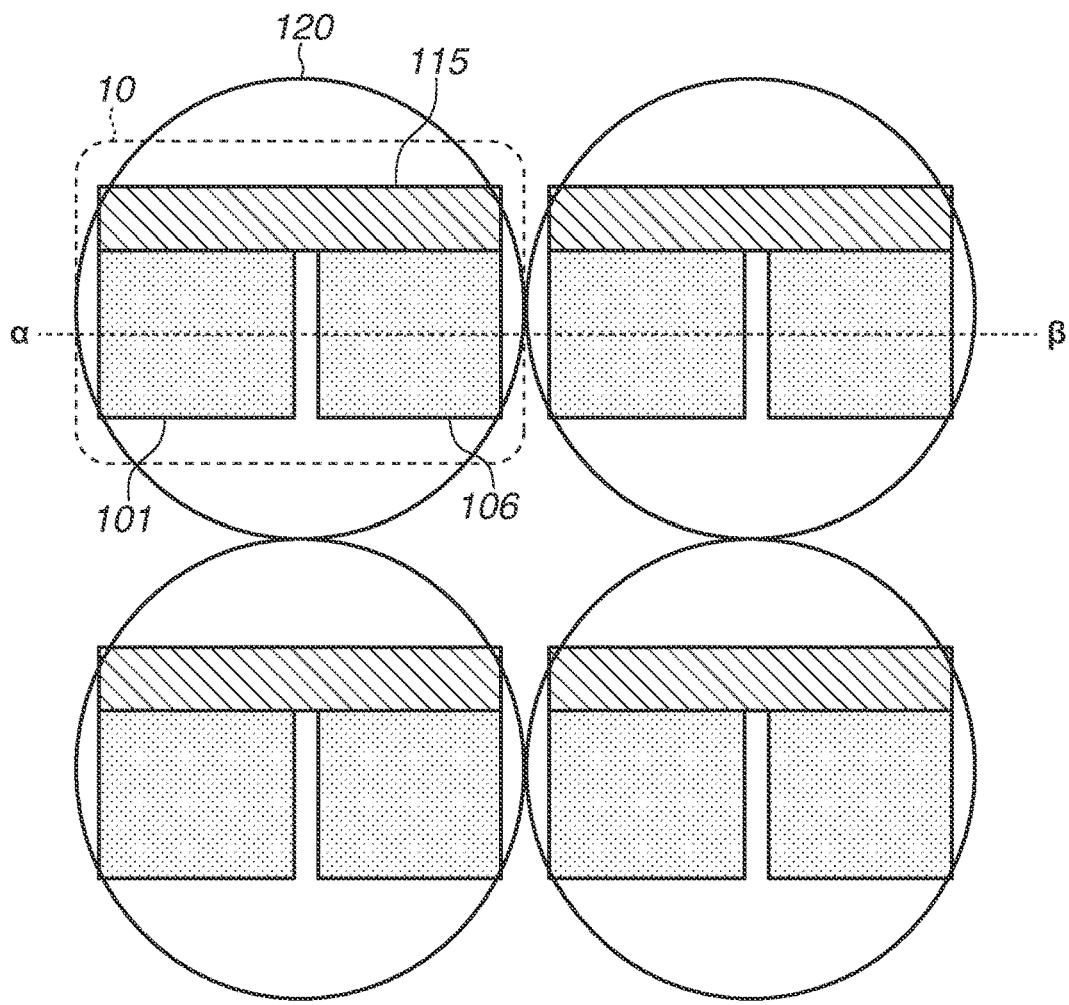
FIG. 9A illustrates a pixel layout.
Figure 9B:
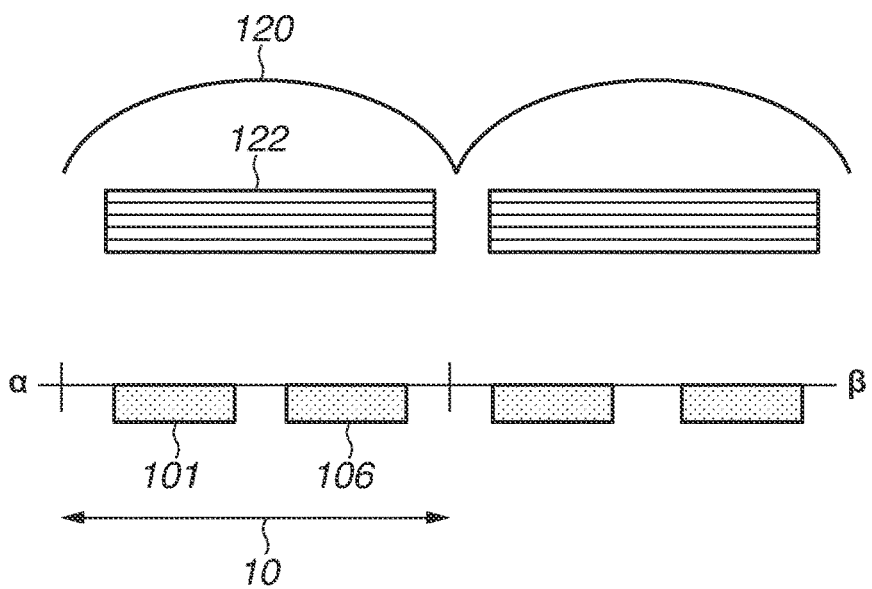
FIG. 9B illustrates a cross section along a line of a pixel layout.

FIGS. 9A and 9B illustrate a layout of the pixel 10 illustrated in FIG. 8. As illustrated in FIG. 9A, the photodiodes 101 and 106 are disposed with respect to one microlens 120. In a reading circuit 115, the transistors included in the pixel 10 described with reference to FIG. 8 are disposed.

FIG. 9B illustrates a cross section along line α-β specified in FIG. 9A. The photodiodes 101 and 106 are provided with respect to each set of one microlens 120 and one color filter 122.

The other configuration of the photoelectric conversion apparatus is similar to that illustrated in FIG. 1.

Figure 10:
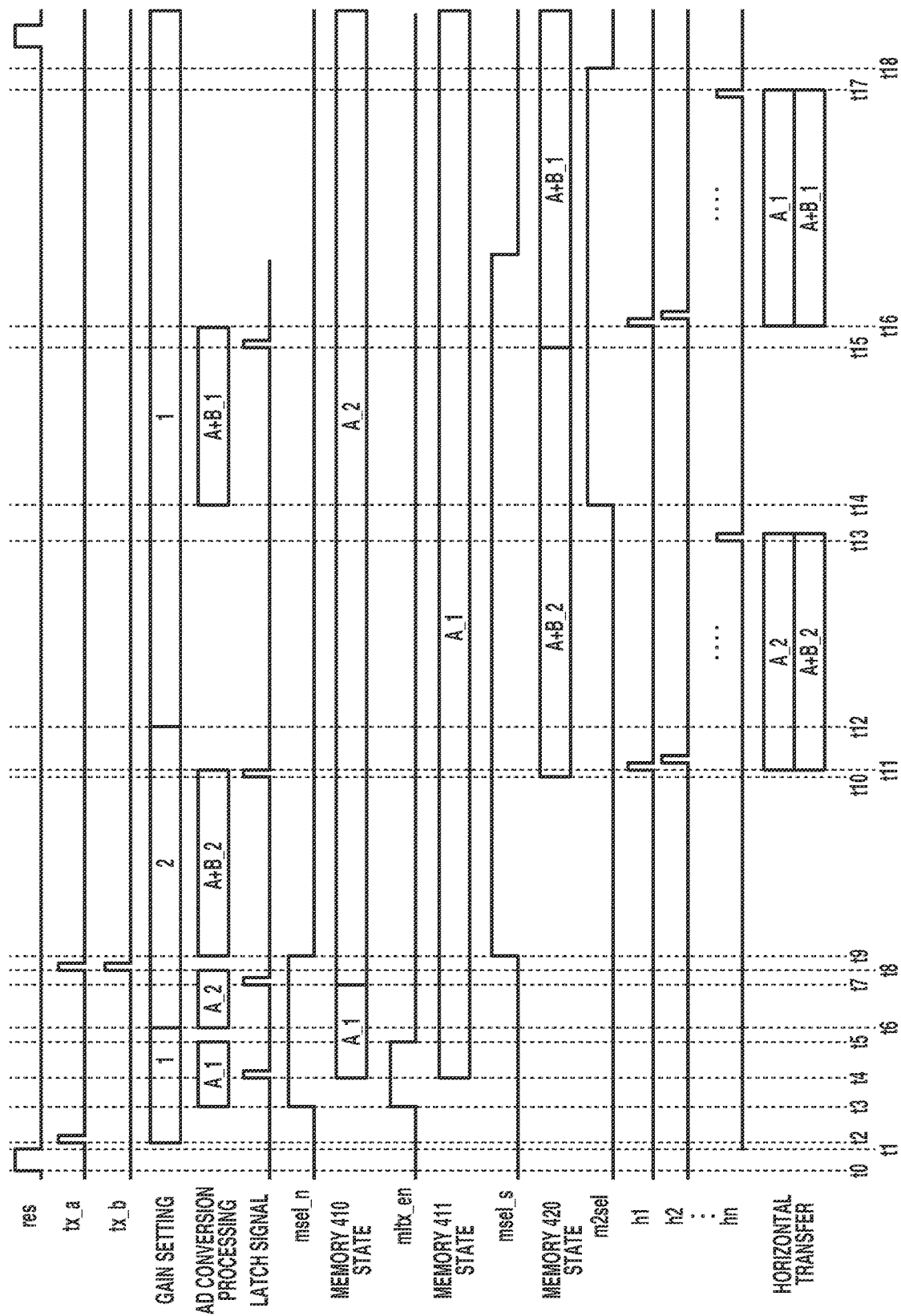
FIG. 10 is a timing chart diagram illustrating operations of the photoelectric conversion apparatus.

FIG. 10 is a timing chart illustrating an operation of the photoelectric conversion apparatus according to the present exemplary embodiment.

A signal output from the pixel 10 based on a charge generated by the photodiode 101 illustrated in FIG. 8 through photoelectric conversion will be referred to as an "A-signal". A signal based on a charge generated by the photodiode 106 illustrated in FIG. 8 through photoelectric conversion will be referred to as a "B-signal". The pixel 10 outputs the A-signal and an A+B signal, which corresponds to a signal generated by adding the A-signal and the B-signal.

The operation up to time t1 is similar to the operation described in the first exemplary embodiment.

At time t2, the signal tx_a is changed to a high level, and a charge generated by the photodiode 101 is transferred to the FD.

Consequently, the amplification transistor 104 of the pixel 10 outputs the A-signal to the signal line 11.

The gain of the amplification unit 2 is set to the first gain. The A-signal (first amplified A-signal) amplified by the amplification unit 2 using the first gain is then input to the comparison unit 3.

At time t3, AD conversion of the first amplified A-signal is started. The memories 410 and 411 hold a digital signal corresponding to the first amplified A-signal.

Thereafter, at time t5, the gain of the amplification unit 2 is set to the second gain.

Consequently, the A-signal (second amplified A-signal) amplified by the amplification unit 2 using the second gain is input to the comparison unit 3.

At time t6, AD conversion of amplified A-signal is started. The digital signal held by the memory 410 is overwritten with a digital signal corresponding to the second amplified A-signal.

In a state where the FD holds the charge of the photodiode 101, the signals tx_a and tx_b are changed to a high level at time t8. Consequently, the charges generated by the photodiodes 101 and 106 from when the signal tx_a is changed to a low level after time t2 until time t8 are transferred to the FD. Accordingly, the amplification transistor 104 of the pixel 10 outputs the A+B signal to the signal line 11.

The gain of the amplification unit 2 is continuously set to the second gain. The A+B signal (referred to as a second amplified A+B signal) amplified by the amplification unit 2 using the second gain is then input to the comparison unit 3. A first amplified A+B signal will be described below.

At time t9, AD conversion of the second amplified A+B signal is started. The memory 420 holds a digital signal corresponding to the second amplified A+B signal.

At and after time t11, horizontal transfer is performed to transfer, from the holding unit 4 of each column to the second output line 95, the digital signals that respectively correspond to the second amplified A-signal and the second amplified A+B signal.

At time t12, the gain of the amplification unit 2 is set to the first gain.

Consequently, the A+B signal (referred to as a first amplified A+B signal) amplified by the amplification unit 2 using the first gain is input to the comparison unit 3.

At time t14, AD conversion of the first amplified A+B signal is started. The memory 420 holds a digital signal corresponding to the first amplified A+B signal.

At and after time t16, horizontal transfer is performed to transfer, from the holding unit 4 of column to the second output line 95, the digital signals that respectively correspond to the first amplified A-signal and the first amplified A+B signal.

As described above, according to the present exemplary embodiment, a fewer number of memories than that of memories used in a conventional technique are needed to read the A-signal and the A+B signal that are read using different gains, so that the circuit size can be reduced.

The setting of the first gain and the setting of the second gain used in the above-described exemplary embodiments can be implemented in any circuit block. The pixel array 1 can be disposed on a same substrate on which the amplification unit 2 and the comparison unit 3 are disposed. The pixel array 1 can be formed on a different substrate from the substrate on which the amplification unit 2 and the comparison unit 3 are disposed, and these plurality of substrates can be bonded together.

The above-described exemplary embodiments can be combined as needed. For example, the generation of digital signals that respectively correspond to the A-signal and the A+B signal and the horizontal transfer according to the fourth exemplary embodiment can be performed using the configuration of the holding unit 4 according to the second or third exemplary embodiment.

Figure 11:
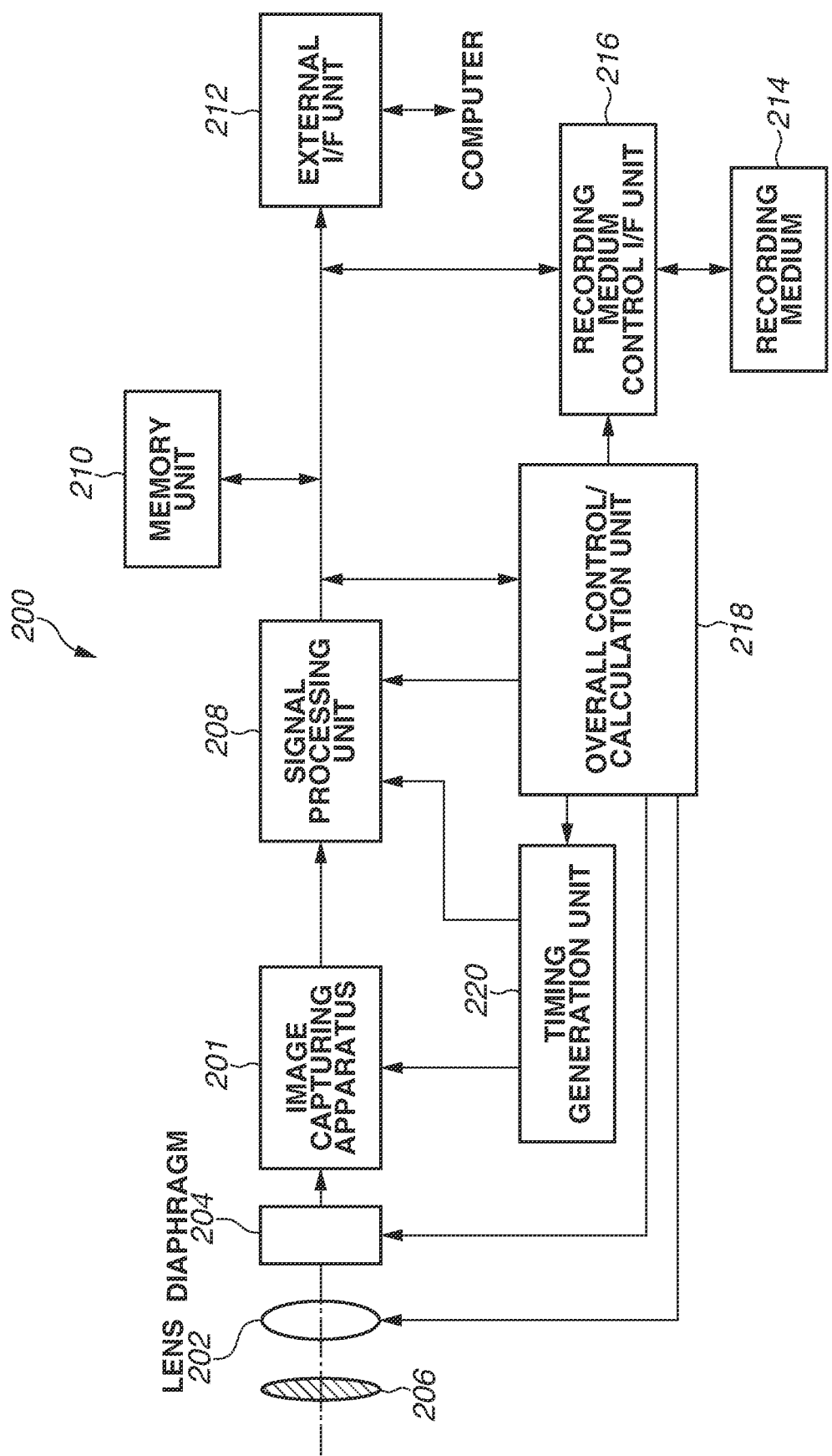
FIG. 11 is a block diagram illustrating a configuration of an image capturing system.

An image capturing system according to a fifth exemplary embodiment will be described below with reference to FIG. 11. FIG. 11 is a block diagram schematically illustrating a configuration of the image capturing system according to the present exemplary embodiment.

The photoelectric conversion apparatus 100 described above in the first to fourth exemplary embodiments is applicable to various image capturing systems. Examples of image capturing systems to which the photoelectric conversion apparatus 100 is applicable include a digital still camera, digital camcorder, monitoring camera, copying machine, facsimile, mobile phone, on-vehicle camera, and observation satellite. A camera module that includes an optical system, such as a lens, and an image capturing apparatus is also encompassed within the scope of the image capturing system. FIG. 11 illustrates a block diagram of a digital still camera as an example.

An image capturing system 200 illustrated in FIG. 11 includes an image capturing apparatus 201, a lens 202, a diaphragm 204, and a barrier 206. The lens 202 forms an optical image of a subject on the image capturing apparatus 201. With the diaphragm 204, the amount of light that passes through the lens 202 can be changed. The barrier 206 protects the lens 202. The lens 202 and the diaphragm 204 are an optical system that focuses light onto the image capturing apparatus 201. The image capturing apparatus 201 is the photoelectric conversion apparatus 100 according to any one of the first to fourth exemplary embodiments, and converts an optical image formed by the lens 202 into image data.

The image capturing system 200 further includes a signal processing unit 208 configured to process a signal output from the image capturing apparatus 201. The signal processing unit 208 performs AD conversion to convert an analog signal output from the image capturing apparatus 201 into a digital signal. The signal processing unit 208 performs other operations, such as various types of correction as needed, and compression, and outputs the resulting image data. The AD conversion unit, which is a part of the signal processing unit 208, can be formed on a semiconductor substrate on which the image capturing apparatus 201 is formed, or can be formed on a different semiconductor substrate from the semiconductor substrate on which the image capturing apparatus 201 is formed. The image capturing apparatus 201 and the signal processing unit 208 can be formed on a same semiconductor substrate.

The image capturing system 200 further includes a memory unit 210, and an external interface unit (external I/F unit) 212. The memory unit 210 temporarily stores image data. The external I/F unit 212 is configured to communicate with an external computer. The image capturing system 200 further includes a recording medium 214 and a recording medium control interface unit (recording medium control I/F unit) 216. The recording medium 214 is a semiconductor memory for recording or reading captured data. The recording medium control I/F unit 216 is configured to record or read data to or from the recording medium 214. The recording medium 214 can be built in the image capturing system 200 or can be a removable recording medium.

The image capturing system 200 further includes an overall control/calculation unit 218 and a timing generation unit 220. The overall control/calculation unit 218 controls various calculations and the entire digital still camera. The timing generation unit 220 outputs various timing signals to the image capturing apparatus 201 and the signal processing unit 208. The timing signals can be input from an outside. The image capturing system 200 only needs to include at least the image capturing apparatus 201 and the signal processing unit 208 that is configured to process a signal output from the image capturing apparatus 201.

The image capturing apparatus 201 outputs a captured signal to the signal processing unit 208. The signal processing unit 208 performs predetermined signal processing on the captured signal output from the image capturing apparatus 201, and outputs image data. The signal processing unit 208 generates an image using the captured signal.

As described above, according to the present exemplary embodiment, the image capturing system to which the photoelectric conversion apparatus 100 according to any one of the first to fourth exemplary embodiments is applied can be realized.

Figure 12A:
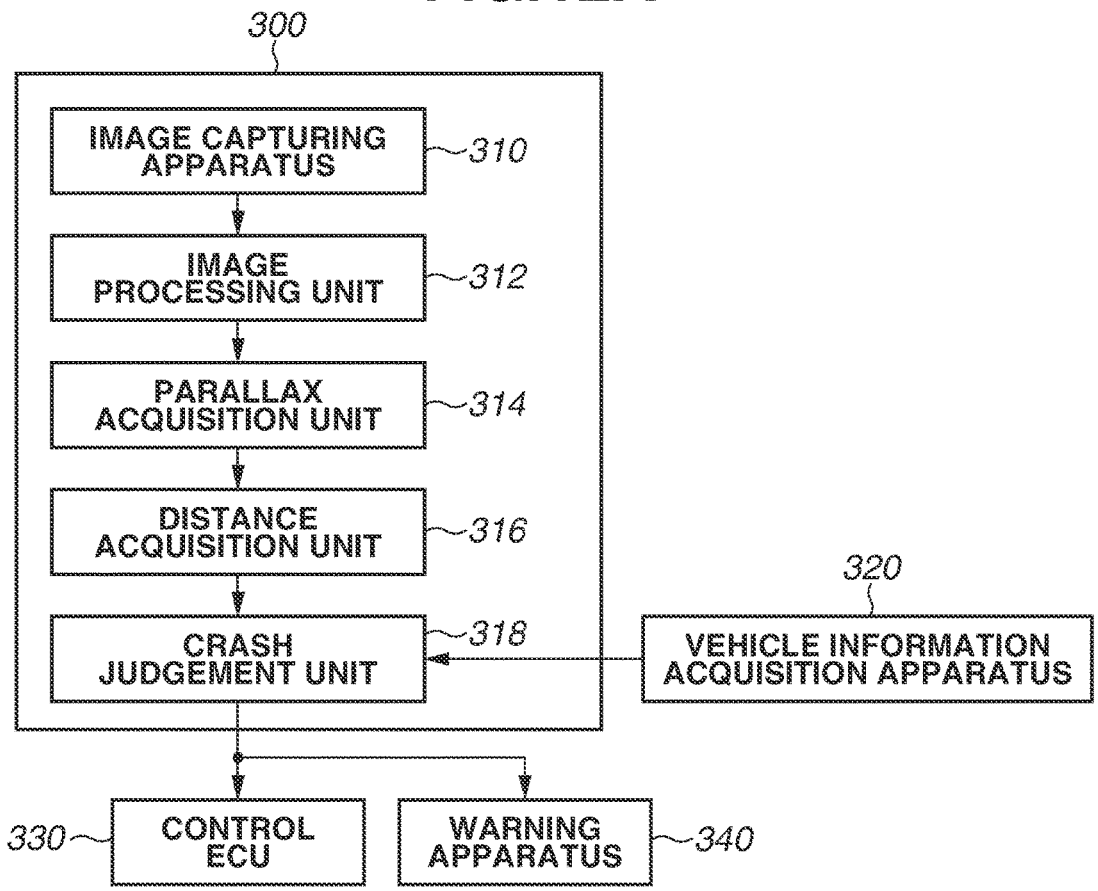
FIG. 12A is a block diagram illustrating an image capturing system that relates to an on-vehicle camera.
Figure 12B:
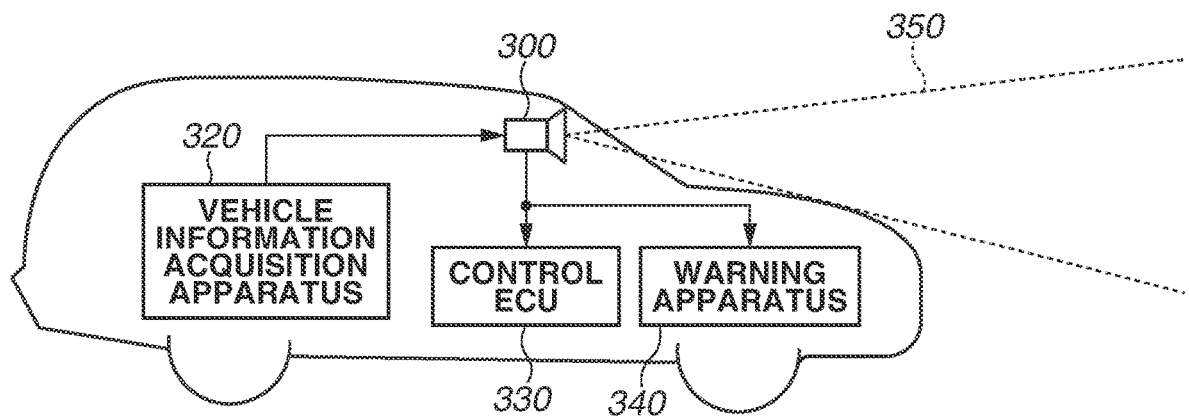
FIG. 12B is a block diagram illustrating a configuration of a moving object.

An image capturing system and a moving object according to a sixth exemplary embodiment will be described with reference to FIGS. 12A and 12B. FIGS. 12A and 12B illustrate a configuration of an image capturing system and a configuration of a moving object according to the present exemplary embodiment.

FIG. 12A illustrates an example of an image capturing system that relates to an on-vehicle camera. An image capturing system 300 includes an image capturing apparatus 310. The image capturing apparatus 310 is the photoelectric conversion apparatus 100 according to any one of the first to fourth exemplary embodiments. The image capturing system 300 includes an image processing unit 312 and a parallax acquisition unit 314. The image processing unit 312 performs image processing on a plurality of pieces of image data acquired by the image capturing apparatus 310. The parallax acquisition unit 314 calculates a parallax (phase difference in a parallax image) from the plurality of pieces of image data acquired by the image capturing system 300. The image capturing system 300 further includes a distance acquisition unit 316 and a crash judgement unit 318. The distance acquisition unit 316 calculates a distance to a target object based on the calculated parallax. The crash judgement unit 318 judges whether there is a possibility of a crash based on the calculated distance. The parallax acquisition unit 314 and the distance acquisition unit 316 are an example of a distance information acquisition unit configured to acquire distance information about a distance to a target object. Specifically, the distance information includes a parallax, defocus amount, and a distance to a target object. The crash judgement unit 318 can judge whether there is a possibility of a crash using any one of the above-described pieces of distance information. The distance information acquisition unit can be realized by dedicated hardware or by a software module. Alternatively, the distance information acquisition unit can be realized by a field programmable gate array (FPGA), an application specific integrated circuit (ASIC), or a combination thereof.

The image capturing system 300 is connected to a vehicle information acquisition apparatus 320 and can acquire vehicle information such as vehicle speed, yaw rate, and rudder angle. The image capturing system 300 is connected to an electronic control unit (ECU) 330. The ECU 330 is a control apparatus configured to output a control signal that generates braking force with respect to the vehicle based on a result of the judgement by the crash judgement unit 318. The image capturing system 300 is connected to a warning apparatus 340 configured to provide a warning to a driver based on a result of the judgement by the crash judgement unit 318. For example, in a case where the crash judgement unit 318 judges that the possibility of a crash is high, the ECU 330 performs vehicle control to brake, release a gas pedal, or reduce engine output to avoid a crash or reduce damage. The warning apparatus 340 warns the user by providing a warning such as a sound, displaying warning information on a screen of a car navigation system, or vibrating a seatbelt or steering.

In the present exemplary embodiment, the image capturing system 300 captures an image of a region around the vehicle, e.g., the front or rear direction of the vehicle. FIG. 12B illustrates the image capturing system 300 in a case where the front direction of the vehicle (e.g., image capturing range 350) is captured. The vehicle information acquisition apparatus 320 transmits an instruction to the image capturing system 300 or to the image capturing apparatus 310. Using the above-described configuration, the accuracy of distance measurement can be further increased.

Although, the example in which control is performed to avoid a crash with another vehicle is described above, the disclosure is also applicable to control that is performed to drive automatically following another vehicle or control that is performed to drive automatically not to go out of lane. The image capturing system 300 is applicable to not only a vehicle, such as a car, but also a moving object (moving apparatus), such as a ship, airplane, and industrial robot. Furthermore, the disclosure is applicable not only to a moving object but also to a wide range of devices using object recognition, such as an intelligent transport system (ITS).

According to the disclosure, various modifications are possible besides the above-described exemplary embodiments.

For example, an example in which a portion of a configuration according to any one of the above-described exemplary embodiments is added to another one of the exemplary embodiments or replaced by a portion of a configuration according to another one of the exemplary embodiments is also an exemplary embodiment of the disclosure.

The image capturing systems according to the fifth and sixth exemplary embodiments illustrate mere examples of an image capturing system to which the photoelectric conversion apparatus is applicable, and the image capturing systems to which the photoelectric conversion apparatus according to any of the exemplary embodiments of the disclosure is applicable are not limited to the configurations illustrated in FIGS. 11 and 12.

It should be noted that each example described in the above-described exemplary embodiments is a mere example of an implementation of the disclosure and is not intended to limit the technical scope of the disclosure. In other words, the disclosure is implementable in various forms without departing from the technical spirit or major feature of the disclosure.

With the disclosure, a plurality of amplified signals is output to an output unit in a suitable order, and the processing time of a processing circuit that receives a signal output from the output unit is reduced.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-059369, filed Mar. 26, 2019, which is hereby incorporated by reference herein in its entirety.

What is claimed is:

1. A photoelectric conversion apparatus comprising:
   a pixel configured to output a first signal at a first timing and a second signal at a second timing different from the first timing;
   an amplification unit configured to amplify the first signal and the second signal and output amplified signals including a first amplified signal, a second amplified signal, a third amplified signal, and a fourth amplified signal;
   an analog to digital (AD) conversion unit configured to perform AD conversion on the amplified signals and output digital signals; and
   an output unit to which the digital signal is input,
   wherein the amplification unit outputs:
      the first amplified signal generated by amplifying the first signal using a first gain;
      the second amplified signal generated by amplifying the first signal using a second gain;
      the third amplified signal generated by amplifying the second signal using a third gain; and
      the fourth amplified signal generated by amplifying the second signal using a fourth gain, to the AD conversion unit in this order,
   wherein the first gain, the second gain, the third gain, and the fourth gain satisfy one of the following amplitude relationships:

$$(\text{the first gain}) < (\text{the second gain}), \text{ and } (\text{the third gain}) > (\text{the fourth gain}) \quad (1);$$

and $$(\text{the first gain}) > (\text{the second gain}), \text{ and } (\text{the third gain}) < (\text{the fourth gain}) \quad (2),$$

wherein the AD conversion unit generates:
      a first digital signal by AD conversion of the first amplified signal;
      a second digital signal by AD conversion of the second amplified signal;
      a third digital signal by AD conversion of the third amplified signal; and
      a fourth digital signal by AD conversion of the fourth amplified signal, and
   wherein the AD conversion unit outputs the second digital signal and the third digital signal to the output unit prior to the first digital signal and the fourth digital signal.

2. The photoelectric conversion apparatus according to claim 1,
   wherein the pixel includes a photoelectric conversion unit configured to accumulate a signal charge based on light and a floating diffusion to which the signal charge is transferred,
   wherein the first signal is a signal based on a potential of the floating diffusion that has been reset, and
   wherein the second signal is a signal based on the potential of the floating diffusion to which the signal charge has been transferred.

3. The photoelectric conversion apparatus according to claim 1,
   wherein the pixel includes a plurality of photoelectric conversion units configured to accumulate a signal charge based on light,
   wherein the first signal is a signal based on the signal charge accumulated by a part of photoelectric conversion units among the plurality of photoelectric conversion units, and wherein the second signal is a signal based on the signal charge accumulated by at least another part of photoelectric conversion units among the plurality of photoelectric conversion units.

4. The photoelectric conversion apparatus according to claim 1, further comprising a first output line and a second output line to which the AD conversion unit and the output unit are connected,
wherein while the AD conversion unit outputs the second digital signal to the output unit via the first output line, the AD conversion unit outputs the third digital signal to the output unit via the second output line.

5. The photoelectric conversion apparatus according to claim 2, further comprising a first output line and a second output line to which the AD conversion unit and the output unit are connected,
wherein while the AD conversion unit outputs the second digital signal to the output unit via the first output line, the AD conversion unit outputs the third digital signal to the output unit via the second output line.

6. The photoelectric conversion apparatus according to claim 3, further comprising a first output line and a second output line to which the AD conversion unit and the output unit are connected,
wherein while the AD conversion unit outputs the second digital signal to the output unit via the first output line, the AD conversion unit outputs the third digital signal to the output unit via the second output line.

7. The photoelectric conversion apparatus according to claim 4, wherein while the AD conversion unit outputs one of the first digital signal and the fourth digital signal to the output unit via the first output line, the AD conversion unit outputs another one of the first digital signal and the fourth digital signal to the output unit via the second output line.

8. The photoelectric conversion apparatus according to claim 1,
wherein the AD conversion unit includes a first memory, a second memory, a third memory, and a selection circuit,
wherein an output node of the first memory and an output node of the second memory are connected to an input node of the selection circuit,
wherein an output node of the selection circuit and an output node of the third memory are connected to the output unit, and the first memory holds the first digital signal,
wherein the second memory holds the second digital signal, and
wherein the third memory holds one of the third digital signal and the fourth digital signal and thereafter holds another one of the third digital signal and the fourth digital signal.

9. The photoelectric conversion apparatus according to claim 8,
wherein the first memory and the second memory both hold the first digital signal, and
wherein thereafter, the second memory holds the second digital signal.

10. The photoelectric conversion apparatus according to claim 8,
wherein the first memory and the second memory both hold the second digital signal, and
wherein thereafter, the second memory holds the first digital signal.

11. The photoelectric conversion apparatus according to claim 8, wherein the output node of the first memory is further connected to an input node of the second memory,
wherein the first memory holds the second digital signal,
wherein the second memory holds the second digital signal input from the first memory, and
wherein thereafter, the first memory holds the first digital signal.

12. The photoelectric conversion apparatus according to claim 8,
wherein the output node of the second memory is further connected to an input node of the first memory,
wherein the second memory holds the first digital signal,
wherein the first memory holds the first digital signal input from the second memory, and
wherein thereafter, the second memory holds the second digital signal.

13. The photoelectric conversion apparatus according to claim 12,
wherein the AD conversion unit further includes a fourth memory having an output node connected to an input node of the third memory,
wherein the fourth memory holds one of the third digital signal and the fourth digital signal,
wherein the third memory holds the one of the third digital signal and the fourth digital signal that is held by the fourth memory.

14. A signal processing circuit to which a first signal and a second signal are input from a pixel at a different timing, the signal processing circuit comprising:
an amplification unit configured to amplify the first signal and the second signal to acquire amplified signals including a first amplified signal, a second amplified signal, a third amplified signal, and a fourth amplified signal, and output the amplified signals;
an AD conversion unit configured to perform AD conversion on the amplified signals to acquire digital signals and output the digital signals; and
an output unit to which the digital signals is input,
wherein the amplification unit outputs:
the first amplified signal generated by amplifying the first signal using a first gain;
the second amplified signal generated by amplifying the first signal using a second gain;
the third amplified signal generated by amplifying the second signal using a third gain; and
the fourth amplified signal generated by amplifying the second signal using a fourth gain, to the AD conversion unit in this order,
wherein the first gain, the second gain, the third gain, and the fourth gain satisfy one of the following amplitude relationships:

$$\text{(the first gain)} < \text{(the second gain), and (the third gain)} > \text{(the fourth gain)} \quad (1);$$

and $$\text{(the first gain)} > \text{(the second gain), and (the third gain)} < \text{(the fourth gain)} \quad (2),$$

wherein the AD conversion unit generates:
a first digital signal by AD conversion of the first amplified signal;
a second digital signal by AD conversion of the second amplified signal;
a third digital signal by AD conversion of the third amplified signal; and
a fourth digital signal by AD conversion of the fourth amplified signal, and wherein the AD conversion unit outputs the second digital signal and the third digital signal to the output unit prior to the first digital signal and the fourth digital signal.

15. An image capturing system comprising:
the photoelectric conversion apparatus according to claim 1; and
a signal processing unit configured to process a signal output from the photoelectric conversion apparatus.

16. A moving object comprising:
the photoelectric conversion apparatus according to claim 1;
a distance information acquisition unit configured to acquire distance information about a distance to a target object using a parallax image based on a signal output from the photoelectric conversion apparatus; and
a control unit configured to control the moving object based on the distance information.

* * * * *